(12) United States Patent
Aiken

(10) Patent No.: US 8,022,236 B2
(45) Date of Patent: Sep. 20, 2011

(54) FATTY ACID ALKYL ESTER PRODUCTION FROM OLEAGINOUS SEEDS

(76) Inventor: John E. Aiken, Monroeville, PA (US)

(*) Notice: Subject to any disclaimer, the term of this patent is extended or adjusted under 35 U.S.C. 154(b) by 556 days.

(21) Appl. No.: 12/287,779

(22) Filed: Oct. 14, 2008

(65) Prior Publication Data

US 2009/0099380 A1   Apr. 16, 2009

Related U.S. Application Data

(60) Provisional application No. 60/998,842, filed on Oct. 12, 2007.

(51) Int. Cl.
*C11C 3/00* (2006.01)
(52) U.S. Cl. ........................................ 554/167
(58) Field of Classification Search ............. 554/167
See application file for complete search history.

(56) References Cited

U.S. PATENT DOCUMENTS

| | | | |
|---|---|---|---|
| 2,383,601 A | 8/1945 | Kelm | |
| 2,494,366 A | 1/1950 | Sprules et al. | |
| 4,164,506 A | 8/1979 | Kawahara et al. | |
| 4,695,411 A | 9/1987 | Stern et al. | |
| 4,698,186 A | 10/1987 | Jeromin et al. | |
| 5,434,279 A | 7/1995 | Wimmer | |
| 7,109,363 B2 | 9/2006 | Brunner et al. | |
| 7,112,229 B2 | 9/2006 | Khalil et al. | |
| 2007/0261294 A1 | 11/2007 | Aiken | |
| 2007/0277432 A1 | 12/2007 | Jackam et al. | |

OTHER PUBLICATIONS

Biodiesel Magazine Jul. 2008 pp. 82-87 (attached).

*Primary Examiner* — Deborah D Carr
(74) *Attorney, Agent, or Firm* — James Ray & Assoc

(57) ABSTRACT

A process is described for producing fatty acid alkyl esters for both diesel fuel and non-fuel uses. The feed material includes whole oleaginous seeds slurried in a liquid triglyceride oil containing at least two weight percent free fatty acid, wherein oil from inside the seeds is first extracted with concurrent esterification of free fatty acids from all sources in an acidic environment. Following sufficient free fatty acid reaction, the intermediate product is subjected to base-catalyzed concurrent extraction and transesterification. Decanting of the byproduct glycerin is followed by water washing. Subsequently, the fatty acid ester product is concurrently purified and fractionated into a biodiesel fuel stream and a non-fuel fraction, each of which undergoes post treatment as needed. The process is optionally integrated with glycerin purification and/or methanol recovery.

19 Claims, 3 Drawing Sheets

FATTY ACID ALKYL ESTER PRODUCTION FROM OLEAGINOUS SEEDS

CROSS REFERENCE TO RELATED APPLICATION

This patent application is related to and claims priority from U.S. Provisional Patent Application Ser. No. 60/998,842 filed Oct. 12, 2007.

FIELD OF THE INVENTION

The present invention relates, in general, to processes for production of alkyl esters of fatty acids and, more particularly, this invention relates to processes for producing fatty acid esters from lower alkyl alcohols and triglycerides derived primarily from small oil-bearing seeds.

BACKGROUND OF THE INVENTION

For processes that produce fatty acid methyl esters (FAME) for biodiesel fuel or other purposes, the predominant triglyceride feeds have been virgin refined vegetable oils and less expensive feeds such as waste cooking oils or yellow grease. Reactions to make the methyl or other alkyl esters typically follow the preferred base-catalyzed transesterification process. Such processes have been described in numerous publications including U.S. Pat. Nos. 2,494,366 and 4,695,411. If significant concentrations of free fatty acids are present in any feed to a base-catalyzed process, they will neutralize at least a portion of the base catalyst thereby wasting catalyst and potential product. The free acids are generally removed as part of the refining process for virgin vegetable oils creating a significant amount of soap stock. This constitutes a yield loss of material otherwise readily converted to FAME. In the case of waste oils and greases, these free fatty acids are commonly esterified with an alcohol, and the water of reaction must be removed to very low concentrations to drive the reversible reaction to nearly complete conversion of the acids. Otherwise, consumption of the base, typically sodium or potassium methoxide, will be excessive in the subsequent transesterification step as will be organic acid salt formation. For example, Kawahara et al in U.S. Pat. No. 4,164,506 discloses blowing methanol vapor into the reaction mix to compensate for methanol entrained out with the water of reaction.

The esterification of free fatty acids may be accomplished by operating in the presence of a mineral acid catalyst and often slightly higher temperatures than for transesterification. In U.S. Pat. No. 4,698,186, Jeromin et al discuss esterification processes employing either an acidic ion-exchange catalyst or toluene-sulfonic acid. Jackam et al in U.S. Patent Application 2007/0277432 teaches a method for converting the free fatty acids in triglyceride feedstocks utilizing glycerolysis of the fatty acids to glycerides which are then fed to a conventional transesterification step. Jackam discloses a reactive distillation step to recover and remove alcohol and glycerin from the FAME. U.S. Patent Application Publication 2007/0261294 teaches the use of a water immiscible alcohol and a very low concentration of sulfonic acid catalyst to accomplish the esterification such that very little of the subsequent base catalyst is consumed in neutralizing it.

A process for producing biodiesel from oleaginous seeds fed into a transesterification reactor is disclosed in U.S. Pat. No. 7,112,229. The are several notable features of this process: 1) the process is tailored toward castor bean feed and ethanol as the preferred alcohol, 2) the seeds are ground or chopped (communited) to a much smaller size, 3) the communited seeds are slurried only in alcohol initially, 4) transesterification with a basic catalyst is the only reaction step, hence no significant amount of free fatty acids from any source can be tolerated, and 5) distillation of the liquid crude product is necessary prior to glycerin decanting. These features present numerous drawbacks for the process of the U.S. Pat. No. 7,112,229 patent, although it does provide some evidence of the feasibility of starting with a seed feed in a biodiesel production process.

Wimmer in U.S. Pat. No. 5,434,279 discloses a process for reacting raw uncleaned oils or fats to a FAME using two steps of base-catalyzed transesterifcation with intermediate re-addition of separated glycerin. However, in the examples, the feeds contain at most 1.4 wt. percent free fatty acids, and since these feeds are subjected to a base-catalyzed reaction first, there cannot be any reaction of the free fatty acids to anything other than sodium or potassium salts of these acids. Hence, there is no yield advantage realized from the contained free fatty acids. In U.S. Pat. No. 7,109,363, Brunner discloses a process for production of fatty acid esters wherein a raw or waste oil undergoes an esterification with a water-free alcohol, followed by contact with a crude glycerin stream recycled from a downstream separation, and, following a phase separation, base catalyzed transesterification is effected, followed by another phase separation. Brunner does not acknowledge or disclose the disposition of the water of reaction that is necessarily formed in the esterification of free fatty acids. Furthermore, the Brunner process has the disadvantage of two steps in between the esterification and transesterification process.

SUMMARY OF THE INVENTION

The present invention provides a process for producing fatty acid alkyl esters for both diesel fuel and non fuel uses from at least two feed sources. The primary feed material is preferably whole oleaginous seeds, which are slurried in liquid triglyceride oil and alcohol, then first extracted and reacted in an acidic environment, then subsequently subjected to base-catalyzed transesterification with concurrent additional extraction. Decanting off the byproduct glycerin is followed by water washing. Lastly, the fatty acid ester product is concurrently purified and fractionated into a biodiesel fuel stream and a non-fuel fraction. The process is preferably optionally integrated with glycerin purification and methanol recovery.

In an alternative embodiment, only the fuel use stream is produced. Another alternative embodiment is distinguished by mechanical fracturing of the shell of the whole seeds prior to introduction to the first reaction. In yet another alternative embodiment, the primary feed material is an unrefined vegetable oil and the secondary feed material is waste grease or cooking oil with significant free-fatty acid content.

OBJECTS OF THE INVENTION

It is, therefore, one of the primary objects of the present invention to provide an economically favorable process for producing fatty-acid esters of lower alkyl alcohols from relatively low-cost feedstocks.

Another object of the present invention is to provide for substantially reduced investment overall for producing fatty-acid esters for biodiesel fuel and chemical intermediates from vegetable seeds by charging the whole seeds directly to a reaction vessel for making the esters without the upstream seed crushing/oil refining operations.

Still another object of the present invention is to provide a fatty acid alkyl ester process that synergistically uses fractional distillation for the three-fold purpose of purifying the products, tailoring the composition of a biodiesel fraction, and supplying at least one low-cost chemical intermediate.

Yet another object of the present invention is to provide a versatile low-feed-cost route to making specification biodiesel fuel and segregating a select portion of the fatty acid esters for non-fuel purposes.

An additional object of the present invention is to provide a fatty acid ester production method that can process a wide range of feed types with a high degree of free fatty acid conversion from seeds as well as waste oils.

A yet additional object of the present invention is to provide a low-feed-cost route to making specification biodiesel fuel and chemical feedstock from unrefined vegetable oils.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
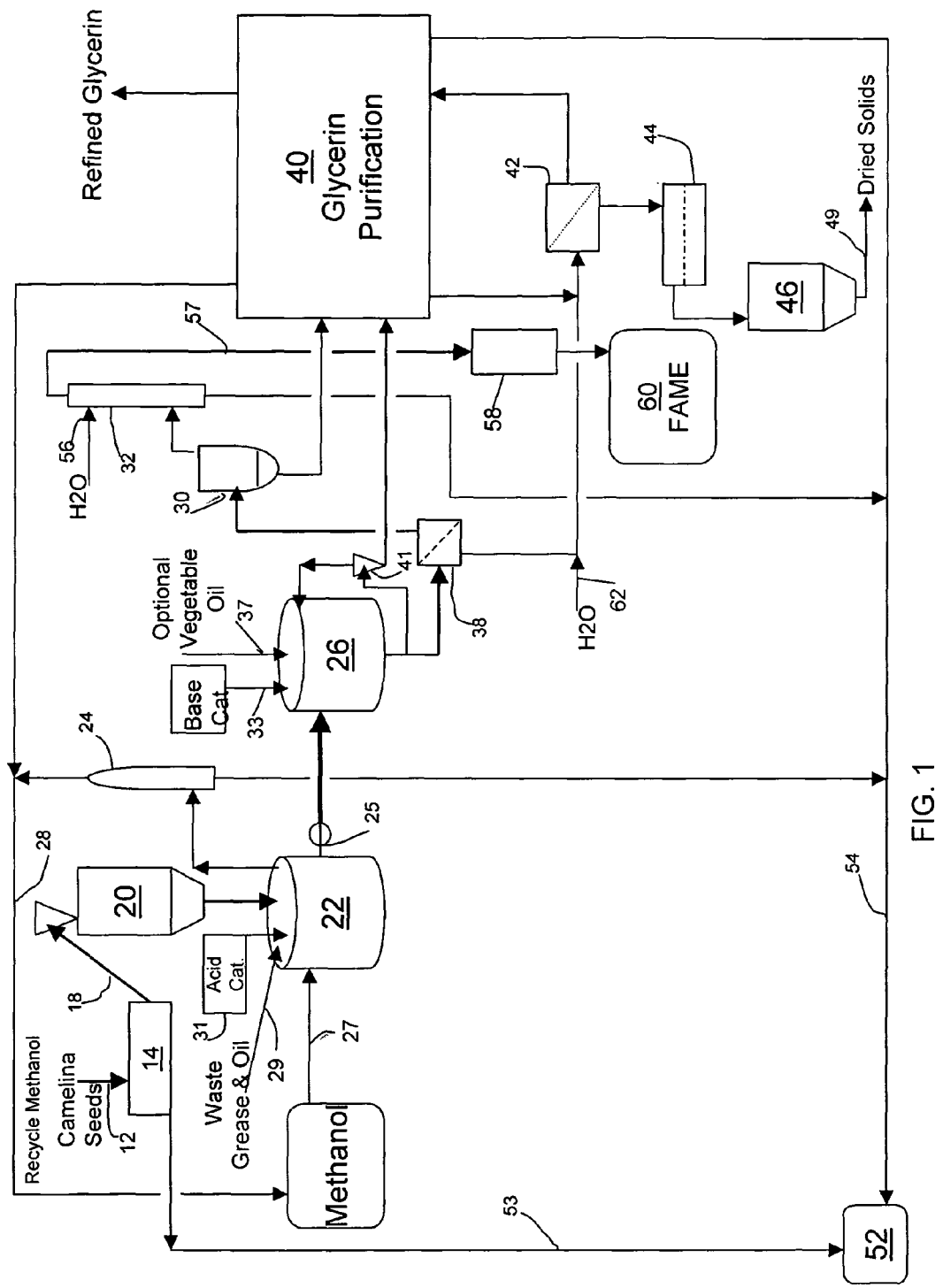
FIG. 1 is a schematic flow diagram of a preferred process for producing fatty acid methyl ester from small triglyceride oil seeds.

DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

An exemplary embodiment of the process will now be described with reference to FIG. 1. The following describes a first embodiment of the invention, but many variations can be envisioned. Parameters subject to optimization in the process include the molar excesses alcohol, and feed combinations. The description herein is for a batch mode of operation, but it could readily be adapted into a continuous process by utilizing multiple vessels in series.

The description that follows pertains to processing beginning with up to 80% of the triglyceride feed being waste oils and greases containing high levels of free fatty acids. These feeds comprise glycerides of fatty acids, primarily triglycerides, and contain at least 1 weight percent of free fatty acids, and typically contain about 15 weight percent, and considerably more is common in some waste oils and greases. The balance of the triglyceride feed comes preferably in the form of whole seeds smaller than 5 mm at the longest dimension, such as camelina or flax seeds, but can alternatively be raw oil extracted from any vegetable seed oil. Camelina seeds typically contain 38 to 42 wt percent triglyceride oil. All of these feeds and similar ones are considered to be within the scope of the invention. The free acid content of the feed is typically expressed as acidity as measured by the acid value (A.V.) of the feed, determined by titration. Acid value is measured herein by titration with a 0.1 N NaOH solution and an indicator (yellow to blue). U.S. Pat. No. 6,822,105 reports typical acid values for a number of feeds, measured using a nearly identical titration method, using KOH instead of NaOH.

The exemplary embodiment described is for the production of fatty acid methyl esters (FAME) since methanol is least expensive and this is the ester typically made in biodiesel production. However, it should be noted that the present invention is not limited to the production of methyl esters of fatty acids. While the methyl ester is preferred, the process of the present invention is equally suitable for the production of other alkyl esters of fatty acids including, but not limited to; ethyl, propyl, butyl, and hexyl. Likewise, camelina seeds are preferred, but other seeds smaller than 5 mm at the greatest dimension are included as well. Camelina seeds have garnered a great deal of attention since 2006 as a biodiesel feedstock source for reasons such as low-input growing and a relatively high oil content of about 40%. See, for example, Biodiesel Magazine, February 2007, and Biodiesel Magazine, July 2008, pgs 82-87. The latter cites one disadvantage of camelina being a high degree of unsaturation that leads to oxidative stability. Another disadvantage sometimes mentioned is the small seed size. It is a goal of the present invention to turn those disadvantages into advantages instead. The small seed size translates to a high ratio of surface area to volume for ease of extraction, and the highly saturated fatty acid esters will be distilled out for use where that unsaturation is desirable. An example would be epoxidized esters for plasticizers or other applications.

The following exemplary embodiment assumes that all feed materials meet modest specifications. Referring to FIG. 1, camelina seeds 12 are conveyed onto a screening and cleaning station 14 to remove dirt and debris. The seeds are then preferably conveyed pneumatically in a warm dry gas stream 18 to ensure low humidity in storage silos 20 into which the seeds are conveyed. Reclaimed feed oil 29, such as brown or yellow grease, is pumped in from a tank farm into esterification reactor 22 such as to account for 10-40% of the total triglyceride feed. The seed feed is drained from hopper 20 into the esterification reactor 22, and agitation along with heating is begun. Methyl alcohol 27 or any C2 to C8 alkyl alcohol is added at about a 20-100% molar excess to the estimated total amount of fatty acid molecules, both free and bound as triglycerides. Typically the alcohol will make up about 20 wt % of the charge. Some of the alkyl alcohol may be recycle methanol 28. To this, an acidic catalyst 31, such as toluene-sulfonic acid at about 0.1 wt. % of estimated total triglyceride is added. This will add acidity about equivalent to an A.V. of 0.3 (red to yellow). The acid not only catalyses the esterification reaction, but it aids in removing polypeptides and phospholipids as taught by Brunner in U.S. Pat. No. 7,109,363, and herein incorporated by reference.

The mix is moderately agitated and heated to about 90° C., when methanol is used, with inert gas blanketing at about two atmospheres pressure. Agitation may come from a mechanical stirrer, circulating with a pump, or sparging with an inert gas. Mechanical agitation with moderate shear is preferred in order to fracture the seeds for improved extraction of the oils. Higher temperatures up to 170 C are used for higher molecular weight alcohols. As esterification of free fatty acids proceeds, both that from waste oil and seed oil, byproduct water is boiled out along with methanol. Simultaneously, extraction of oil from the seed is occurring. In separation unit 24, most of the water is separated from the methanol, and the recycle methanol 28 is returned to the process eventually. Multistage distillation is the most common water removal method. When a C6 to C8 alkyl alcohol is used for the esterification, the condensed overhead alcohol can be gravity settled into two phases, and the low-water alcohol phase is fed back into the reactor. After about 2 to 4 hours, the acid value should be below 1.0 (>95% reacted).

The reaction mix is then transferred from esterification reactor 22 to transesterification reactor 26 with cooling in heat exchanger 25 as needed. A base catalyst 33 is added, and optional refined virgin vegetable oil 37 can be added as desired for final product characteristics. For example, palm kernel oil may be more economical at times that other refined vegetable oils. Additional methyl alcohol 27 or any C2 to C8 alkyl alcohol is added as needed to bring the total alcohol to a 20-100% molar excess to the estimated total amount of fatty acid molecules bound as triglycerides. All or at least part of this alcohol requirement may optionally have been added to the esterification reactor 22. Typically the alcohol will make up about 20 wt % of the charge. After about one to two hours with agitation in reactor 26 at 60-70 degrees C., the reaction and extraction will be essentially complete. Optionally, reactor 26 contents are circulated during this period through a liquid separation cyclone ("hydroclone") 41 to aid in removal of glycerin. After the transesterification reaction is essentially complete, the contents of reactor 26 are then pumped out through a filter 38 to remove solids, and then into decanter 30, from which fatty acid methyl ester (FAME) flows overhead, and byproduct glycerin is removed from the bottom. The glycerin fraction flows into a glycerin recovery and purification unit 40. Methanol is also recovered in this step and makes up a portion of the recycle methanol stream 28.

FAME from the top of decanter 30 is washed with water or an acidic aqueous solution 56 in a countercurrent wash unit 32, and removed glycerin, methanol, and salts flow to the glycerin unit 40. The washed FAME is post treated in step 58 with clays, Magnesol®(magnesium silicate), ion-exchange resins, or the like, as needed to remove impurities and water to meet biodiesel specifications. On-spec product is then held in storage vessel 60.

Solids from the filter 38 and any from the glycerin unit 40 are water washed on filter 42 to remove water soluble impurities with the aqueous stream flowing to the glycerin purification unit 40. The solids are dried in dryer 44 and collected in silo 46 for subsequent shipment for use in animal feeds, fertilizer, other uses, or disposal if necessary. The various wastewater streams including 53 and 54 are collected in a reservoir 52 for eventual disposal on site or at a public treatment works.

Figure 2:
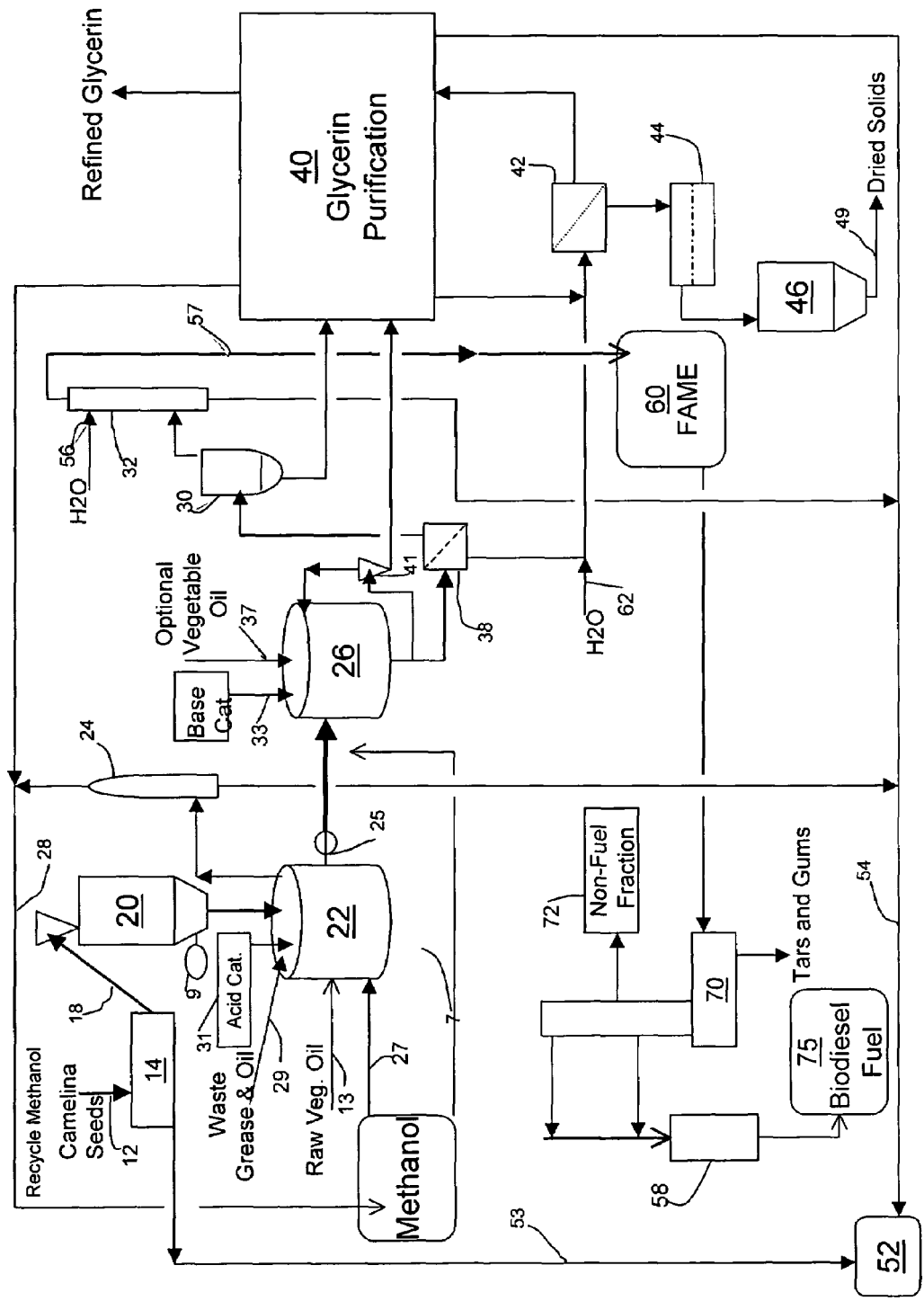
FIG. 2 is schematic flow diagram of a preferred process for producing fatty acid alkyl esters for both biodiesel fuel and a portion for other chemical production.

FIG. 2 depicts a preferred embodiment of the present invention using a very similar process with further processing of the FAME product. Alternatively or additionally, raw vegetable oil 13 is added as the liquid feed. The seeds entering the reactor 22 pass through a mechanical device 9 that fractures the outer shell of the seeds for greater exposure of the oil inside the seed to the other feed oils 13 and 29 as well as the alcohol 27. This mechanical device 9 may be, for example, twin rollers that compress the seeds as they enter. The seeds generally remain in one piece, but in a flattened condition with the shell cracked into a few segments. In order to reduce treatment needs at unit 58 and also better ensure quality of the FAME, FAME from storage vessel 60 is routed to distillation unit 70, wherein batch vacuum distillation occurs, typically below 50 millimeters of mercury absolute pressure. The bulk of the product is collected in vessel 75 as biodiesel fuel, but a significant non-fuel fraction 72 is also produced. Examples of non-fuel fractions are the methyl esters of C12 lauric acid, and methyl esters of the C18 linoleic and linolenic acids, which are unsaturated and amenable to epoxidation for plasticizers and other products. The lauric ester can undergo hydrogenolysis with hydrogen to make lauryl alcohol. Better quality is ensured by distilling products away from any tars or gums, resulting from use of raw triglyceride oils, the heavies being sent to disposal. While distillation is relatively expensive and not typically necessary in biodiesel processes, the added cost is more that offset in the present invention by the reduced feed costs and the ability to produce custom fractions. As needed to meet all specifications, a final post treatment 58 with Magnesol®, ion exchange resins, or the like, is performed.

Figure 3:
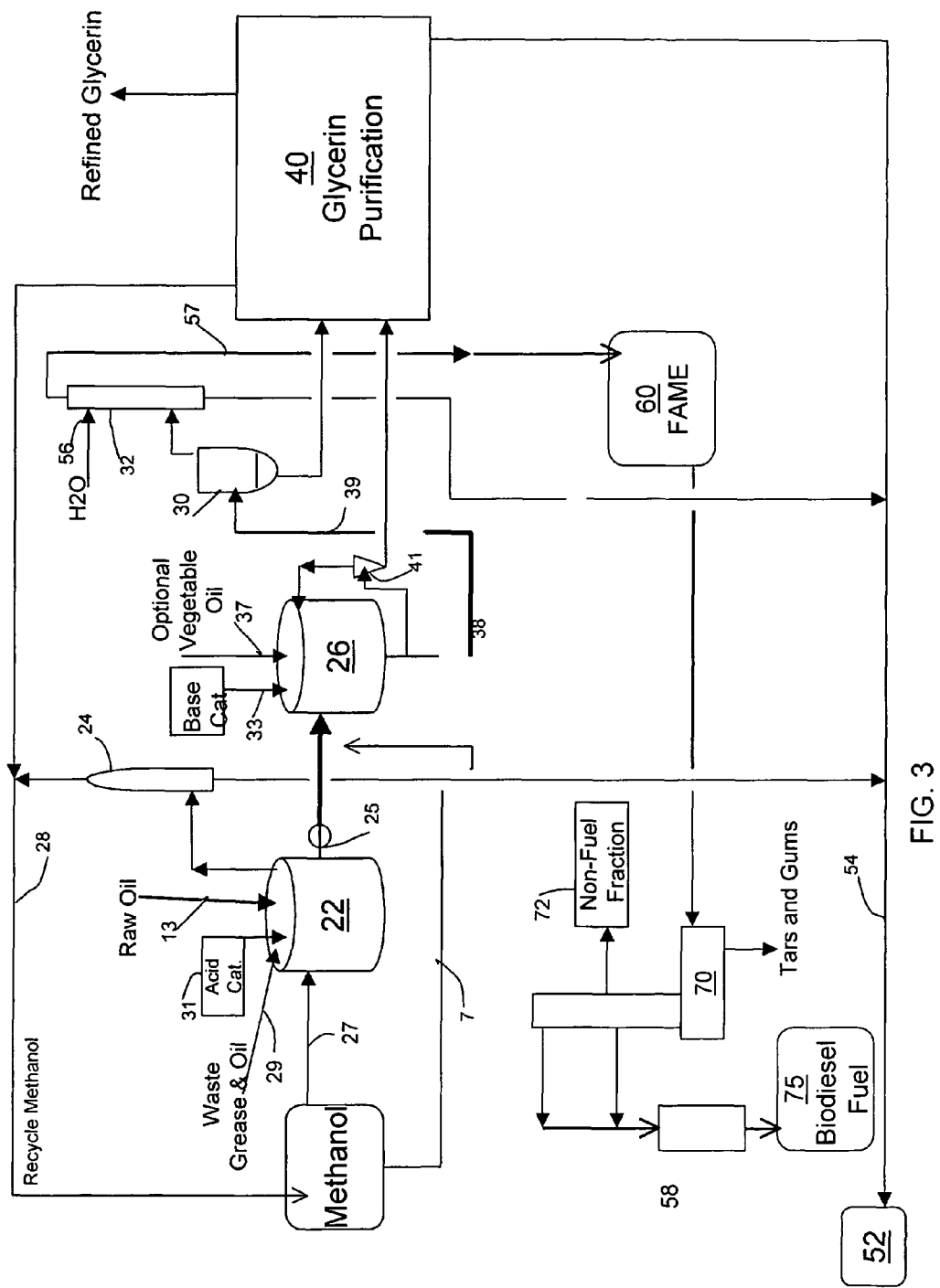
FIG. 3 provides a process flow diagram for an alternative embodiment of the present invention based on primarily raw oil feedstocks.

FIG. 3 provides a schematic process flow diagram for an alternative embodiment of the present invention. The primary difference relative to that of FIG. 2 is the absence of the whole seeds as part of the feed, and raw oil 13 derived from oleaginous seeds is instead introduced into esterification reactor 22 along with optional waste grease or oil 29, acid catalyst 31 and methanol 27. Methyl alcohol 27 or any C2 to C8 alkyl alcohol is added at about a 20-100% molar excess to the estimated total amount of fatty acid molecules, both free and bound as triglycerides. Typically the alcohol will make up about 20 wt % of the charge. Some of the methanol may be recycle methanol 28. The acid catalyst may be a heterogeneous type such as an acidic resin as taught by U.S. Pat. No. 4,698,186, incorporated herein by reference, but typically the acid catalyst will be a low level (about 0.1 wt %) of a strong acid such as toluene sulfonic acid or sulfuric acid. Water of reaction is boiled or stripped out of reactor 22 along with some alcohol, and the alcohol is separated from most of the water in unit 24 yielding recycle alcohol 28 and wastewater 54, which is collected in holding vessel 52 for subsequent disposal. After sufficient reaction of the free fatty acids to esters, the contents of reactor 22 are transferred through cooler 25 into transesterification reactor 26, to which are added a base catalyst 33, optional refined vegetable oil 37, and additional methanol 27. As transesterification occurs, the contents of reactor 26 may optionally be circulated through a centrifugal liquid separator 41 to remove byproduct glycerin and aid in agitation. Upon substantial completion of the transesterification in less than two hours at 55 to 70 degrees Celsius, the contents of reactor 26 are routed to settler 30.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims. For example, the process may be practiced in continuous mode as opposed to the batch mode described.

What is claimed is:

1. A method for producing fatty acid alkyl esters from at least two sources of triglycerides, said method comprising:
   a) providing a triglyceride feed material of at least 10 weight percent whole oleaginous seeds and at least one of an unrefined vegetable oil and reclaimed oil containing glycerides of fatty acids with at least two weight percent of free fatty acids;
   b) adding an acid catalyst and at least one C1 to C8 alkyl alcohol to said triglyceride feed material to form a first reaction mixture, wherein said alcohol is added in a molar excess relative to said free fatty acids in said triglyceride feed material;

c) extracting triglycerides and fatty acids present within said whole oleaginous seeds contained in said first reaction mixture by heating said first reaction mixture to between about 60 and 150 degrees Celsius;

e) forming, concurrent with said extracting, an ester of said alkyl alcohol and said free fatty acids in said first reaction mixture by removing by-product water of reaction with a portion of said alkyl alcohol;

f) adding to esterified said first reaction mixture at least one C1 to C4 alkyl alcohol and a base catalyst to form a second reaction mixture, wherein said C1 to C4 alkyl alcohol is in a molar excess relative to fatty acids bound as triglycerides;

g) forming fatty acid alky esters of said bound triglyceride fatty acids and said at least one C1 to C4 alcohol, and a glycerol byproduct, by maintaining said second reaction mixture at a temperature of 50 to 80 degrees Celsius, h) filtering substantially all solids from product of said second reaction mixture;

i) separating substantially all said byproduct glycerol from said fatty acid alkyl esters;

j) washing said fatty acid alkyl esters by contacting with an aqueous solution followed by phase separation of an aqueous layer; and k) purifying said fatty acid alkyl esters by preselected means to meet standard biodiesel specifications.

2. The method for producing fatty acid alkyl esters, according to claim 1, wherein said acid catalyst is toluene sulfonic acid.

3. The method for producing fatty acid alkyl esters, according to claim 1, wherein said base catalyst is one of sodium methoxide and potassium methoxide.

4. The method for producing fatty acid alkyl esters, according to claim 1, wherein said whole oleaginous seeds are one of camelina and flax seeds.

5. The method for producing fatty acid alkyl esters, according to claim 1, wherein said method further includes a step of fractional vacuum distillation after said step of washing with water and before said step of purifying said fatty acid alkyl esters.

6. The method for producing fatty acid alkyl esters, according to claim 1, wherein said preselected means of purifying is passing said fatty acid esters over an adsorbent bed of at least one of activated carbon, magnesium silicate, ion exchange resin, and diatomaceous earth.

7. The method for producing fatty acid alkyl esters, according to claim 1, wherein said method includes steps of separating substantially all of said portion of said alkyl alcohol from said byproduct water, and recycling recovered said alkyl alcohol to said esterification step.

8. A method for producing fatty acid alkyl esters from at least two sources of triglycerides, said method comprising:
a) providing a triglyceride feed material of at least 10 percent whole oleaginous seeds and at least one of an unrefined vegetable oil and reclaimed oil containing glycerides of fatty acids with at least two weight percent of free fatty acids;
b) adding an acid catalyst and at least one C1 to C8 alkyl alcohol to said triglyceride feed material to form a first reaction mixture, wherein said alcohol is added in a molar excess relative to said free fatty acids in said triglyceride feed material;
c) extracting triglycerides and fatty acids present within said whole oleaginous seeds contained in said first reaction mixture by heating said first reaction mixture to between about 60 and 150 degrees Celsius;
d) forming, concurrent with said extracting, an ester of said alkyl alcohol and said free fatty acids in said first reaction mixture by removing by-product water of reaction with a portion of said alkyl alcohol;
e) adding to esterified said first reaction mixture at least one C1 to C4 alkyl alcohol and a basic alkoxide catalyst to form a second reaction mixture, wherein said C1 to C4 alkyl alcohol is in a molar excess relative to fatty-acids bound as triglycerides;
f) forming fatty acid alkyl esters of said bound triglyceride fatty acids and said at least one C1 to C4 alcohol, and a glycerol byproduct, by maintaining said second reaction mixture at a temperature of 50 to 80 degrees Celsius,
g) separating substantially all said byproduct glycerol from said fatty acid alkyl esters;
h) washing said fatty acid alkyl esters by contacting with an aqueous solution followed by phase separation of an aqueous layer;
i) fractionally distilling said fatty acid alkyl esters into at least two product streams and a bottoms residue at an absolute pressure less than 50 millimeters of mercury; and
j) purifying said fatty acid alkyl ester product streams by preselected means to meet predetermined specifications.

9. The method for producing fatty acid alkyl esters, according to claim 8, wherein said preselected means of purifying is passing said fatty acid esters over an adsorbent bed of at least one of activated carbon, magnesium silicate, ion exchange resin, and diatomaceous earth.

10. The method for producing fatty acid alkyl esters, according to claim 8, wherein said method includes a step of fracturing by mechanical means a shell of said whole oleaginous seeds preceding said step of providing a triglyceride feed material.

11. The method for producing fatty acid methyl esters, according to claim 8, wherein said basic catalyst is one of sodium methoxide and potassium methoxide.

12. The method for producing fatty acid methyl esters, according to claim 8, wherein said method includes a step of adding refined vegetable oil after said step of forming an ester of said alkyl alcohol and said free fatty esters and before said step of adding a C1 to C4 alkyl alcohol.

13. A method for producing fatty acid alkyl esters from at least two sources of triglycerides, said method comprising:
a) providing a triglyceride feed material of at least one of an unrefined vegetable oil, reclaimed cooking oil, and greases from animal fat containing glycerides of fatty acids with additionally at least two weight percent of free fatty acids;
b) adding to said triglyceride feed material a C1 to C8 alkyl alcohol and an acid catalyst to form a first reaction mixture, wherein said alkyl alcohol is added at a predetermined molar ratio to said contained glycerides of fatty acids in said triglyceride feed material;
c) forming an ester of said alkyl alcohol and said free fatty acids by heating said first reaction mixture and removing by-product water of reaction with a portion of said alkyl alcohol;
d) adding to esterified said first reaction mixture a basic catalyst to form a second reaction mixture;
e) forming fatty acid alkyl esters of said bound triglyceride fatty acids and said at least one C1 to C8 alcohol, and a glycerol byproduct, by maintaining said second reaction mixture at a temperature of 50 to 80 degrees Celsius,
f) separating substantially all said byproduct glycerol from said fatty acid alkyl esters;

g) washing said fatty acid alkyl esters by contacting with an aqueous solution followed by phase separation of an aqueous layer;
h) fractionally distilling said fatty acid alkyl esters into at least two product streams and a bottoms residue at an absolute pressure less than 50 millimeters of mercury; and
i) purifying said fatty acid alkyl esters by preselected means to meet predetermined specifications.

14. The method for producing fatty acid alkyl esters, according to claim 13, wherein said predetermined molar ratio of said alkyl alcohol to said contained triglycerides is about 3.0 to 6.0.

15. The method for producing fatty acid alkyl esters, according to claim 14, wherein said preselected means of purifying is passing said fatty acid esters over an adsorbent bed of at least one of activated carbon, magnesium silicate, ion exchange resin, and diatomaceous earth.

16. The method for producing fatty acid alkyl esters, according to claim 13, wherein said acid catalyst is toluene sulfonic acid.

17. The method for producing fatty acid alkyl esters, according to claim 13, wherein said method includes a step of adding refined vegetable oil after said step of forming an ester of said alkyl alcohol and said free fatty esters and before said step of adding a basic catalyst.

18. The method for producing fatty acid alkyl esters, according to claim 13, wherein said basic catalyst is one of sodium methoxide and potassium methoxide.

19. The method for producing fatty acid alkyl esters, according to claim 13, wherein said method further includes a step of purifying said glycerol byproduct with recycle of removed alcohol to said step of adding said C1 to C8 alkyl alcohol.

* * * * *